(12) United States Patent
Kunatharaju et al.

(10) Patent No.: US 12,506,387 B2
(45) Date of Patent: Dec. 23, 2025

(54) BALANCED MOTOR COOLING USING CROSS FLOW

(71) Applicant: Rivian IP Holdings, LLC, Irvine, CA (US)

(72) Inventors: Venkata Harish Kumar Kunatharaju, Irvine, CA (US); Dang Dinh Dang, Garden Grove, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 296 days.

(21) Appl. No.: 17/698,245

(22) Filed: Mar. 18, 2022

(65) Prior Publication Data
US 2023/0299642 A1  Sep. 21, 2023

(51) Int. Cl.
| | | |
|---|---|---|
| H02K 9/19 | (2006.01) | |
| H02K 1/20 | (2006.01) | |
| H02K 3/24 | (2006.01) | |
| H02K 5/20 | (2006.01) | |

(52) U.S. Cl.
CPC ............... *H02K 9/19* (2013.01); *H02K 1/20* (2013.01); *H02K 3/24* (2013.01); *H02K 5/20* (2013.01)

(58) Field of Classification Search
CPC .. H02K 9/19; H02K 5/20; H02K 1/32; H02K 1/20
See application file for complete search history.

(56) References Cited

U.S. PATENT DOCUMENTS

| | | | | |
|---|---|---|---|---|
| 5,889,342 A * | 3/1999 | Hasebe | ............... | H02K 9/19 |
| | | | | 310/156.19 |
| 6,012,909 A * | 1/2000 | Sloteman | ............. | H02K 5/1282 |
| | | | | 417/370 |
| 6,489,697 B1 * | 12/2002 | Ozawa | ................ | H02K 3/30 |
| | | | | 310/58 |
| 2013/0334912 A1 * | 12/2013 | Tokunaga | ............ | H02K 9/19 |
| | | | | 310/54 |
| 2016/0372983 A1 * | 12/2016 | Okochi | ................. | H02K 1/32 |
| 2018/0205294 A1 * | 7/2018 | Manabe | .............. | H02K 9/19 |
| 2019/0173352 A1 * | 6/2019 | Yamaguchi | ......... | H02K 9/19 |

FOREIGN PATENT DOCUMENTS

| | | |
|---|---|---|
| JP | 2009-171785 A | 7/2009 |
| JP | 2011-254571 A | 12/2011 |
| JP | 2014-057433 A | 3/2014 |

(Continued)

*Primary Examiner* — Terrance L Kenerly
*Assistant Examiner* — Theodore L Perkins
(74) *Attorney, Agent, or Firm* — Haley Guiliano LLP

(57) ABSTRACT

Rotor channels extend axially in a rotor to provide flow of coolant in opposite directions to provide a more uniform thermal gradient. The rotor channels include a first rotor channel coupled to a first feed hole via an annulus and extending axially in a first direction to a first side hole, and a second rotor channel coupled to a second feed hole via an annulus and extending axially in the opposite direction to a second side hole. The rotor includes a first end plate arranged at a first axial position that includes the first side hole, and a second end plate arranged at a second axial position that includes the second side hole. The first and second end plates are identical and are arranged azimuthally at an angle to each other. Fluid flows through the channels, cooling the rotor, and then flows past end windings for stator cooling.

17 Claims, 6 Drawing Sheets

(56) References Cited

FOREIGN PATENT DOCUMENTS

| | | |
|---|---|---|
| JP | 2017-200333 A | 11/2017 |
| JP | 2019-134564 A | 8/2019 |
| JP | 2020-014355 A | 1/2020 |
| WO | 2007/055192 A1 | 5/2007 |
| WO | 2015/019402 A1 | 2/2015 |
| WO | 2017/018067 A1 | 2/2017 |
| WO | 2019/049394 A1 | 3/2019 |
| WO | 2020/108842 A1 | 6/2020 |
| WO | 2021/142673 A1 | 7/2021 |

\* cited by examiner

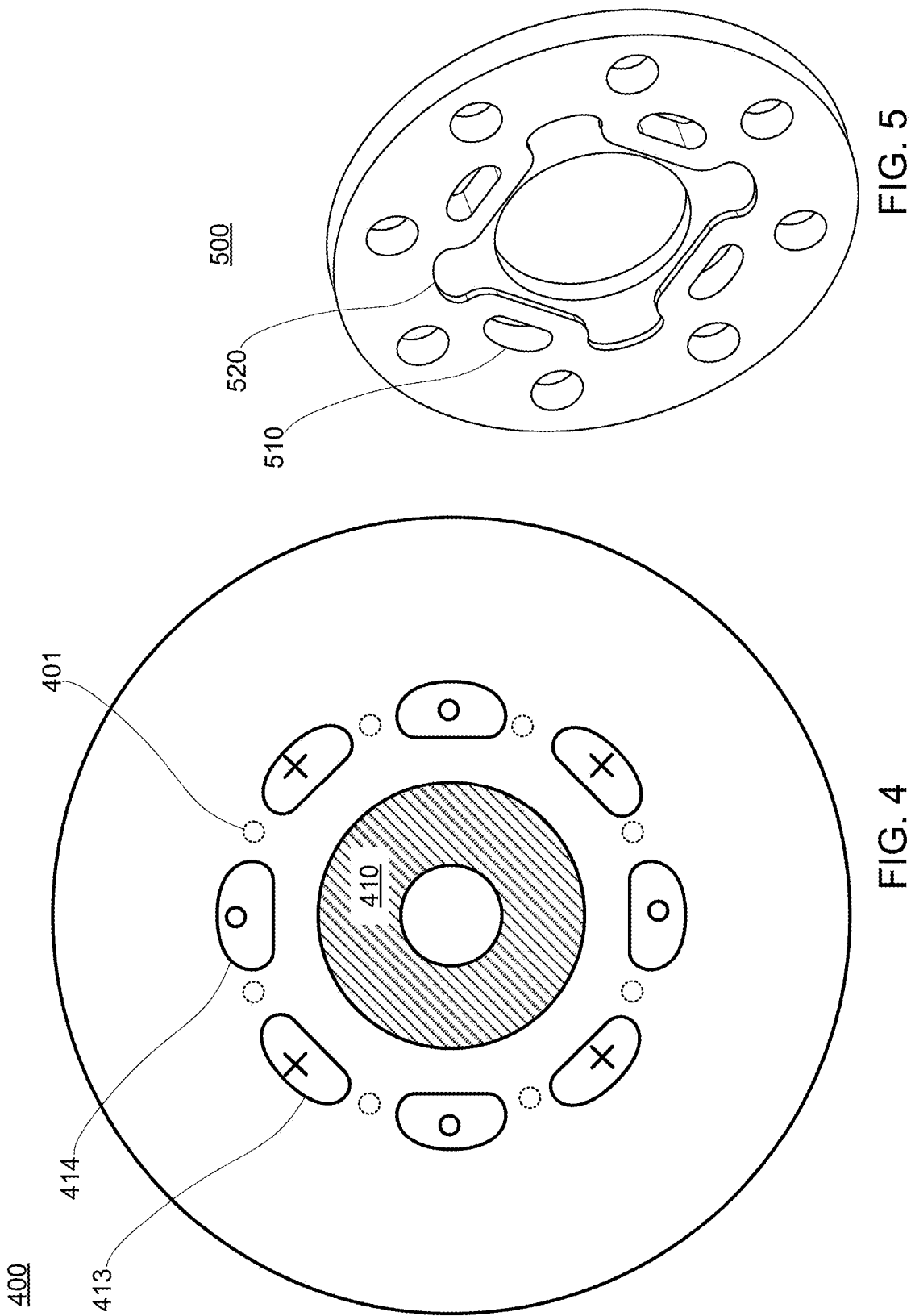

BALANCED MOTOR COOLING USING CROSS FLOW

INTRODUCTION

The present disclosure is directed towards methods and systems for achieving balanced motor cooling using cross flow in opposite directions.

SUMMARY

In some embodiments, the present disclosure is directed to a cooling apparatus. The cooling apparatus includes a plurality of rotor channels extending axially through a rotor assembly and configured to provide cross flow of coolant in axially opposite directions. In some embodiments, the present disclosure is directed to a cooling apparatus having a first rotor channel and a second rotor channel. The first rotor channel extends axially through a rotor assembly and is configured to provide coolant flow in a first axial direction. The second rotor channel extends axially through the rotor assembly and is configured to provide coolant flow in a second axial direction opposite the first axial direction. In some embodiments, the rotor assembly is part of an electric motor, and heat is generated in the rotor and end windings of a stator as the electric motor is operated. For example, the coolant flows in a cross flow pattern in the rotor assembly to cool the rotor, and then flows past end windings of the stator to remove heat from the end windings.

In some embodiments, the plurality of rotor channels includes a first rotor channel coupled to a first feed hole, and a second rotor channel coupled to a second feed hole. The first rotor channel extends axially in a first direction to a first side hole, and the second rotor channel extends axially in a second direction, which his opposite the first direction, to a second side hole. In some embodiments, the first rotor channel and the second rotor channel are formed in a body of the rotor assembly. For example, the body may include an axial stack of steel laminations, each having a pattern of holes to collectively form the rotor channels.

In some embodiments, the cooling apparatus includes a first end plate arranged at a first axial position, and a second end plate arranged at a second axial position. The first end plate includes the first side hole, and the second end plate includes the second side hole. In some embodiments, the first end plate includes a first annular recess that couples the second feed hole to the second rotor channel, and the second end plate includes a second annular recess that couples the first feed hole to the first rotor channel. In some embodiments, the first end plate and the second end plate are identical, and the first end plate is arranged azimuthally at an angle to the second plate. For example, the first and second end plates may be clocked 45 degrees, or any other suitable angle, from each other.

In some embodiments, the cooling apparatus includes a rotor shaft having a hollow interior region. For example, the first feed hole and the second feed hole are open to the hollow interior region, and the hollow interior region is configured to receive the coolant.

In some embodiments, the first feed hole, the first rotor channel, and the first side hole form a first flow path for the coolant. In some such embodiments, the second feed hole, the second rotor channel, and the second side hole form a second flow path for the coolant. For example, the first flow path and the second flow path form a cross flow pattern, where a first stream of the coolant flows in one axial direction and a second stream of the coolant flows in the opposite axial direction.

In some embodiments, the present disclosure is directed to an apparatus having a shaft, a body, a first end plate, and a second end plate. The shaft includes a first feed hole arranged at a first axial position and a second feed hole arranged at a second axial position spaced axially from the first axial position. The body includes one or more first rotor channels and one or more second rotor channels. The first end plate includes a first annular recess and a first side hole. The first annular recess (i.e., an annulus) opens to the one or more second rotor channels, and the first side hole opens to the one or more first rotor channels. The second end plate includes a second annular recess and a second side hole. The second annular recess (i.e., an annulus) opens to the one or more first rotor channels, and the second side hole opens to the one or more second rotor channels.

In some embodiments, the one or more first rotor channels and the one or more second rotor channels are formed in a body of the rotor. In some embodiments, the first end plate is arranged at a first axial position, the second end plate arranged at a second axial position, and the first axial position and the second axial position are at opposite axial ends of the body.

In some embodiments, the first end plate and the second end plate are identical, and the first end plate is arranged azimuthally at an angle to the second plate. In some embodiments, the angle is dependent on the number of side holes, number of rotor channels, or both. For example, the angle is about forty-five degrees in some embodiments having four side holes on each end plate.

In some embodiments, the shaft includes a hollow interior region, the first feed hole and the second feed hole are open to the hollow interior region, and the hollow interior region is configured to receive a fluid. In some embodiments, the first feed hole, the one or more first rotor channels, and the first side hole form a first flow path for a fluid. In some such embodiments, the second feed hole, the one or more second rotor channels, and the second side hole form a second flow path for the fluid. The first flow path and the second flow path form a cross flow pattern, in which a first stream of the coolant flows in one axial direction in the first path and a second stream of the coolant flows in the opposite axial direction in the second path.

In some embodiments, the body includes a plurality of laminations stacked axially, with each respective lamination having a respective plurality of openings. The respective plurality of openings collectively form the one or more first rotor channels and the one or more second rotor channels. For example, by stacking N laminations, each having thickness t, a channel length of N*t is formed in the axial direction.

In some embodiments, the first end plate is configured to direct a fluid from the first side hole radially outward to first end windings, and the second end plate is configured to direct the fluid from the second side hole radially outward to second end windings. For example, the fluid flows radially outward (e.g., as a spray, stream, or other suitable form) to splash, impinge, or otherwise flow over and around the end windings, thus convectively cooling the end windings.

In some embodiments, the present disclosure is directed to a method for cooling a motor. The method includes providing a coolant to a plurality of rotor channels extending axially through a rotor assembly and configured to provide cross flow of the coolant. The method also includes generating heat in the rotor assembly and transferring the heat from the plurality of rotor channels to the coolant.

In some embodiments, the plurality of rotor channels includes a first rotor channel and a second rotor channel. In some such embodiments, the method includes providing the coolant to a first rotor channel coupled to a first feed hole, wherein the first rotor channel extends axially in a first direction to a first side hole. In some such embodiments, the method includes providing the coolant to a second rotor channel coupled to a second feed hole, wherein the second rotor channel extends axially in a second direction, opposite the first direction, to a second side hole. For example, the method may include providing the coolant to a hollow region of a rotor shaft that is open to the first and second feed holes.

In some embodiments, the rotor assembly includes a first end plate that is arranged at a first axial position, and a second end plate that is arranged at a second axial position. The first end plate includes the first side hole, and the second end plate includes the second side hole. In some such embodiments, the method includes causing the coolant to flow radially outward along the first end plate to first end windings, causing the coolant to flow radially outward along the second end plate to second end windings, and transferring heat from the first end windings and from the second end windings to the coolant.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIG. 4 shows an end cross-sectional view of an illustrative rotor having channels, in accordance with some embodiments of the present disclosure;

FIG. 5 shows a perspective view of an illustrative end plate having openings and a recess, in accordance with some embodiments of the present disclosure;

DETAILED DESCRIPTION

One issue that can arise in motor cooling architectures is imbalanced cooling of the electric motor at end windings, particularly at the internal diameter and the rotor core. In some embodiments, the present disclosure is directed to achieving balanced cooling of stator end windings using flow through a rotor, with cross flow directed by rotor common end plates. For example, motor losses give rise to heat generation, which can be extracted through stator and rotor cooling. As used herein, "cross flow" refers to flows in opposing directions (e.g., referring to axially counter-flowing streams of coolant).

Figure 1:
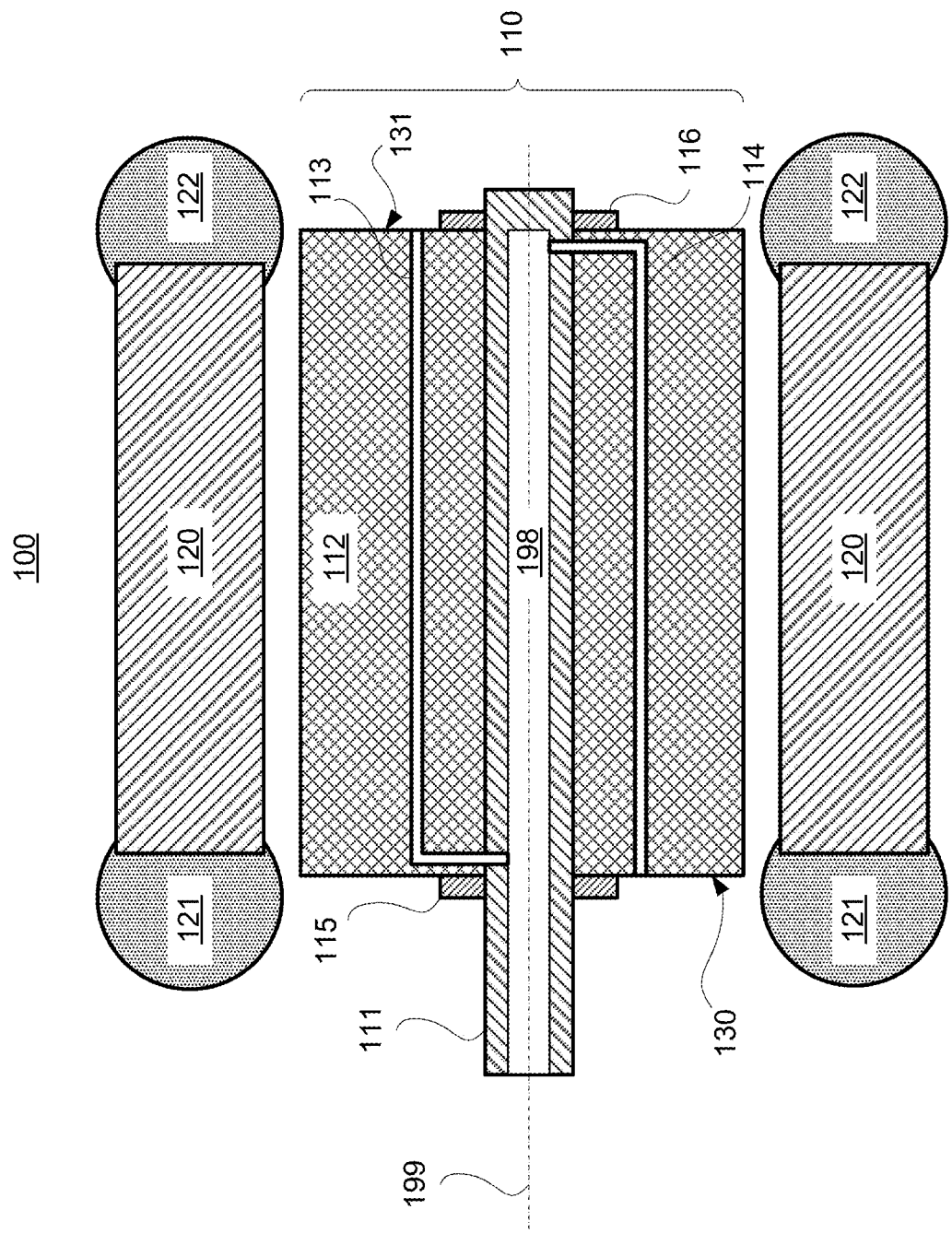
FIG. 1 shows a block diagram of an illustrative electric motor having a rotor configured for cross flow, in accordance with some embodiments of the present disclosure.

FIG. 1 shows a block diagram of illustrative electric motor 100 having rotor 110 configured for cross flow, in accordance with some embodiments of the present disclosure. As illustrated, electric motor 100 includes stator 120, which includes end windings 121 and 122, and rotor 110, which includes shaft 111 with recess 198, and body 112 with channels 113 and 114 (e.g., rotor channels). As illustrated, electric motor 100 also includes bearings 115 and 116 for constraining rotor 110 to rotate about axis 199, which corresponds to the axial direction. In some embodiments, not illustrated in FIG. 1, rotor 110 includes a common end plate at each axial end of body 112 (see, e.g., FIG. 2). In some embodiments, rotor 110 is an interior permanent magnet (IPM) rotor, which may inherently produce relatively higher torque density and power density due to combined magnet torque and reluctant torque. In some embodiments, even though IPM rotor losses, core losses, and magnet losses may be relatively lower than traditional induction motors, rotor loss does still occur in permanent magnet motors. For example, rotor losses may translate to heat, which can have an impact on both permanent magnet remanence (Br) and coercivity (Hcj), which may result in torque reduction and lower demagnetization capability. Accordingly, stator balanced cooling of end winding and rotor cooling is critical to operation of a motor (e.g., an IPM motor), and for performance optimization and achieving a more constant thermal gradient in the motor.

In order to achieve balanced cooling of stator end windings and a more uniform thermal gradient in rotor 110, a fluid (e.g., liquid lubricant such as oil) is provided in axially counter flow through rotor 110 via channels 113 and channels 114. The fluid is provided from a heat exchanger, radiator, or other coolant condition system to recess 198 of shaft 111 (e.g., recess 198 may be a blind hole and shaft 111 may be hollow). As the relatively cool oil enters recess 198 (e.g., of the hollow rotor shaft, as illustrated), the fluid then flows to channels 113 and 114, which are open to recess 198 proximal to respective, opposite axial ends of body 112. Each of channels 113 and 114 may include a respective set of channels arranged azimuthally about axis 199 (e.g., in an equally spaced pattern or other suitable arrangement). The fluid flows axially in channels 113 in a first direction and flows axially in channels 114 in a second direction opposite the first direction, thus forming an axially cross flow arrangement. As the fluid flows through channels 113 and 114, the fluid absorbs heat generated from losses in rotor 110 through contact between the fluid and the walls of channels 113 and 114 of body 112 (e.g., which may include electrical steel). Because channels 113 and 1114 form a cross flow arrangement, rotor 110 may exhibit a relatively more uniform temperature gradient (e.g., axial temperature gradients are lessened). The heat fluid, after absorbing the heat from losses in rotor 110, flows out of channels 113 and 114 and along the end faces 130 and 131 of body 112. The fluid travels radially outward along end faces 130 and 131 (e.g., due to centrifugal forces), and then cools end windings 121 and 122 (e.g., corresponding to a lead side and a weld side in a hairpin-type stator). The fluid heat from end windings 121 and 122 approximately symmetrically, thus resulting in balanced cooling of end windings 121 and 122 on either axial end of stator 120. To illustrate, the fluid may spray from end faces 130 and 131 radially outwards to end windings 121 and 122, and then flow, drip, or otherwise return to a basin for recirculation in the fluid system (e.g., to re-enter recess 198 and repeat heat transfer in a continuous flow).

In an illustrative example, electric motor 100 may correspond to an electric motor having improved performance, due at least in part to effective heat extraction using fewer parts. To illustrate, a rotor such as rotor 110 may exhibit a uniform thermal gradient while the fluid extracts heat from the core of rotor 110. In some embodiments, body 112 includes a plurality of laminations and two end plates, which have a common design, thus resulting in relatively low cost part and fewer parts or part types. To illustrate further, symmetrical flow of fluid (e.g., oil) to weld and lead sides (e.g., end windings 121 and 122) of stator 120 may result in balanced cooling for stator 120.

Figure 2:
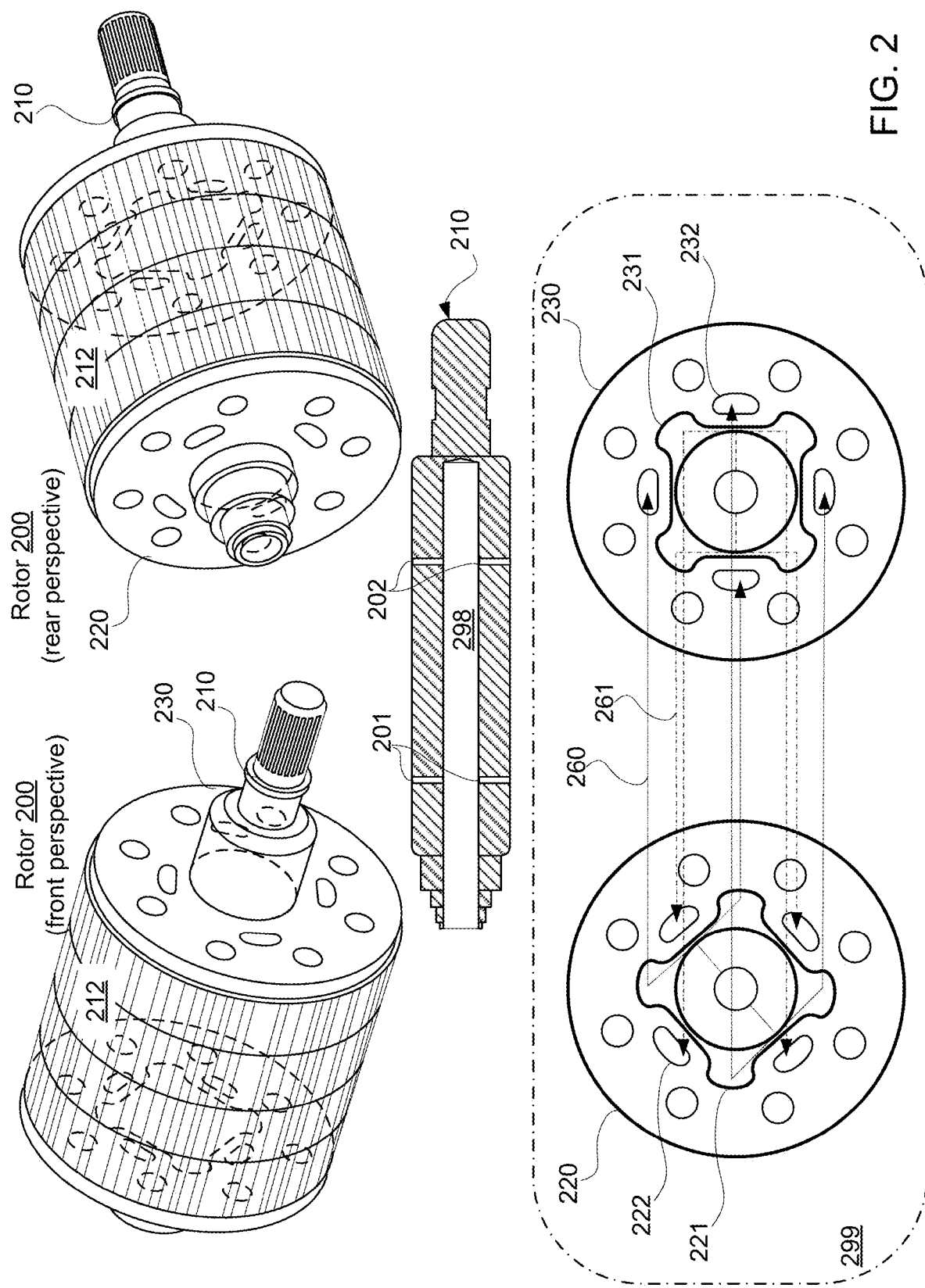
FIG. 2 shows several views of an illustrative rotor, and components thereof, configured for cross flow, in accordance with some embodiments of the present disclosure.

FIG. 2 shows several views, including front and rear perspective views, of illustrative rotor 200, and components thereof, configured for cross flow, in accordance with some embodiments of the present disclosure. As illustrated, rotor 200 includes rotor shaft 210, end plates 220 and 230, and body 212. Rotor shaft 210 includes hollow interior region 298, which opens to feed holes 201 and 202 (e.g., each of feed holes 201 and 202 includes two feed holes 180 degrees apart as illustrated, although any suitable number of feed holes may be included, such as one, two, or more than two). End plates 220 and 230 are identical to each other, but clocked azimuthally forty-five degrees relative to each other such that recess 221 aligns azimuthally with side holes 232, and recess 231 aligns azimuthally with side holes 222. As illustrated in panel 299, with end plates 220 and 230 shown in exploded isolation, flow paths 260 and 261 are cross flow paths.

A fluid such as oil enters the two holes (e.g., 180° apart) of feed holes 201, and fills the end-plate anulus (e.g., the cavity indicated by recess 221 of end plate 220). Similarly, in parallel, the fluid enters the two holes (e.g., 180° apart) of feed holes 202, and fills the other end-plate anulus (e.g., the cavity indicated by recess 231 of end plate 230). To illustrate, the fluid may include two streams (e.g., primarily in parallel), one directed to feed holes 201 and the other directed to feed holes 202. After entering feed holes 201 and 202, the fluid travels axially through rotor 200 (e.g., body 212 may be formed by electrical steel). For example, rotor 200 includes channels corresponding to side holes 222 and 232, which form a cross flow pattern as shown in panel 299. As the fluid flows through the channels, heat (e.g., caused by rotor loss) is absorbed by the fluid through contact between the fluid and body 212 (e.g., electrical steel thereof).

In an illustrative example, pockets of recess 221 (e.g., lobes of recess 221) of end plate 220 line up with four holes in body 212 (e.g., the rotor laminate stack), and similarly, pockets of recess 231 (e.g., lobes of recess 231) of end plate 230 line up with the other four holes in body 212 (e.g., the rotor laminate stack). This arrangement allows fluid cross flow for rotor heat dissipation with uniform temperature gradient in rotor 200. After absorbing the heat from rotor loss, the fluid exiting out from end plates 220 and 230 via sides holes 222 and 232, and then travels radially outward, cooling the stator end-windings on each axial end (e.g., the lead side and the weld side for a hairpin type motor). To illustrate, end windings 121 and 122 are illustrated in FIG. 1, and rotor 200 is part of an illustrative motor having end windings such as end windings 121 and 122. The fluid extracts heat from end windings symmetrically resulting in balance of end windings on both axial ends of the stator. In a further illustrative example, use of common end plates 220 and 230 allows low cost part and fewer parts. Further, symmetrical flows of oil to both end windings result in balanced cooling at the ends of the stator.

Figure 3:
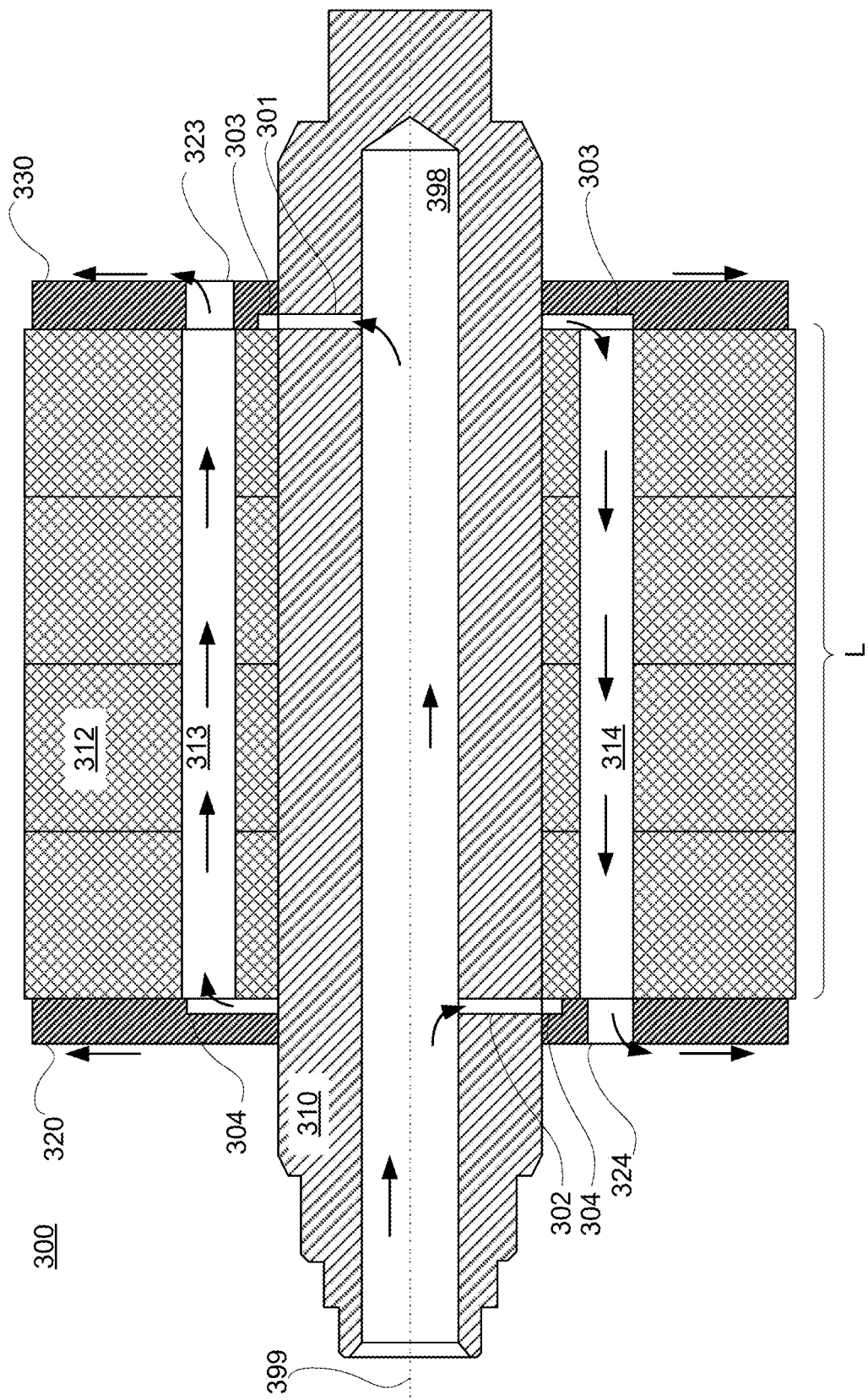
FIG. 3 shows a side cross-sectional view of an illustrative rotor having two sets of channels, in accordance with some embodiments of the present disclosure.

FIG. 3 shows a side cross-sectional view of illustrative rotor 300 having two sets of channels, in accordance with some embodiments of the present disclosure. Rotor 300 may be assembled along with bearings and a stator to form an electric motor. As illustrated, rotor 300 (e.g., also referred to as a rotor assembly) includes shaft 310 (e.g., also referred to as a rotor shaft), body 312, and end plates 320 and 330. Shaft 310 includes feed holes 301 and 302 (e.g., openings of any suitable cross-sectional shape), which are both open to the interior of shaft 310 (i.e., recess 398 of shaft 310). Channels 313 and 314 form a cross flow arrangement for cooling rotor 300 (e.g., via flow of a fluid such as oil), wherein the fluid travels axially or primarily axially. In some embodiments, a plurality of rotor channels (e.g., channels 313 and 314) extend axially through a rotor assembly (e.g., rotor 300) and configured to provide cross flow of coolant, which may be a fluid such as oil. In some embodiments, rotor 300 is the same as, or otherwise similar to, rotor 200 of FIG. 2, for example.

Opening 301 interfaces with recess 303 of end plate 330, allowing fluid to flow from recess 398 to feed hole 301, and then from recess 303 to channel 314. The fluid then flows from channel 314 to side hole 324 (e.g., one or more openings) of end plate 320, and flows radially outward to cool end windings of the stator.

Opening 302 interfaces with recess 304 of end plate 320, allowing fluid to flow from recess 398 to feed hole 302, and then from recess 304 to channel 313. The fluid then flows from channel 313 to side hole 323 (e.g., one or more openings) of end plate 330, and flows radially outward to cool end windings of the stator.

Body 312 forms channels 313 and 314, thus directing fluid from recess 398 through rotor 300 and out to end windings of the stator. In some embodiments, body 312 includes a plurality of laminations (e.g., stacked steel plates, for reducing eddy currents) arranged axially along axis 399. In some embodiments, end plates 320 and 330 are identical, and are arranged in rotor 300 rotated from one another about axis 399 by a predetermined amount. For example, in some embodiments, each of end plates 320 and 330 may include four openings (e.g., which include side holes 324 and 323, respectively), and are rotated 45° relative to each other (e.g., as illustrated in FIG. 2).

In some embodiments, a rotor (e.g., rotor 300) includes a plurality of rotor channels, including a first rotor channel (e.g., of channels 314) coupled to a first feed hole (e.g., feed hole 301), wherein the first rotor channel extends axially (e.g., along axis 399) in a first direction to a first side hole (e.g., side hole 324). The plurality of rotor channels also includes a second rotor channel (e.g., of channels 313) coupled to a second feed hole (e.g., feed hole 302), wherein the second rotor channel extends axially in a second direction, opposite the first direction, to a second side hole (e.g., side hole 323). In some embodiments, a rotor includes a first end plate (e.g., end plate 320) arranged at a first axial position, and including the first side hole (e.g., side hole 324). In some such embodiments, the rotor includes a second end plate (e.g., end plate 330) arranged at a second axial position (e.g., spaced a distance "L" from the first axial position), and including the second side hole (e.g., side hole 323). As illustrated in FIG. 3, the first end plate (e.g., end plate 320) includes a first annular recess (e.g., recess 304) that couples the second feed hole (e.g., feed hole 302) to the second rotor channel (e.g., of channels 313). Further, as illustrated in FIG. 3, the second end plate (e.g., end plate 330) includes a second annular recess (e.g., recess 303) that couples the first feed hole (e.g., feed hole 301) to the first rotor channel (e.g., of channels 314). In some embodiments, end plate 320 and end plate 330 are identical, and are arranged azimuthally at an angle to each other (e.g., the first end plate is clocked relative to the second end plate).

In some embodiments, a rotor (e.g., rotor 300) includes a rotor shaft (e.g., shaft 310) that includes a hollow interior region (e.g., illustrated by recess 398). In some such embodiments, the first feed hole (e.g., feed hole 301) and the second feed hole (e.g., feed hole 302) are open to the hollow interior region (e.g., recess 398), and the hollow interior region is configured to receive the coolant (e.g., from an oil conditioning system). In some embodiments, the first feed hole (e.g., feed hole 301), the first rotor channel (e.g., of channels 314), and the first side hole (e.g., side hole 324) form a first flow path for the coolant. In some such embodiments, the second feed hole (e.g., feed hole 302), the second rotor channel (e.g., of channels 313), and the second side hole (e.g., side hole 323) form a second flow path for the coolant, where the first flow path and the second flow path form a cross flow pattern. To illustrated, the first rotor channel (e.g., of channels 314) and the second rotor channel (e.g., of channels 313) are formed in a body (e.g., body 312) of the rotor assembly (e.g., rotor 300).

In some embodiments, heat (e.g., oil-absorbed rotor loss) is transported from side holes (e.g., side holes 323 and 324) towards an inner surface of end windings (e.g., an inner diameter (ID) of end windings). In some embodiments, the fluid (e.g., cooled oil provided to the hollow shaft) fills up annular recesses (e.g., recesses 303 and 304) as it flows from feed holes (e.g., feed holes 301 and 302) to the plurality of channels (e.g., of channels 313 and 314).

FIG. 4 shows an end cross-sectional view of illustrative rotor 400 having channels 413 and 414, in accordance with some embodiments of the present disclosure. Rotor 400 includes shaft 410 and a plurality of rotor channels, which include channels 413 (e.g., indicated by "+" symbols) and channels 414 (e.g., indicated by "o" symbols). Channels 413 and 414 are arranged azimuthally around rotor 400. For example, as illustrated in FIG. 4, rotor 400 includes eight channels (e.g., four channels 413 and four channels 414) spaced 45 degrees azimuthally. As illustrated in FIG. 4, In an illustrative example, the body of rotor 400 may include a plurality of steel laminations having channels 413 and 414 included as through reliefs. To illustrate, rotor 400 may be, but need not be, the same as or similar to rotor 300 of FIG. 3 or rotor 110 of FIG. 1. To illustrate further, oil other suitable fluid may be directed to flow in one axial direction in channels 413 (e.g., into the page, as illustrate in FIG. 4), and the other axial direction in channels 414 (e.g., out of the page, as illustrate in FIG. 4). The set of circles indicated by zones 401 approximately correspond to uniform thermal gradient zones, achieved by using a cross flow pattern. For example, each of zones 401 may exhibit a relatively uniform thermal (heat) gradient for the rotor body (e.g., extending axially through the stack-up of laminations), and thus more uniform axial temperature distribution.

Figure 6:
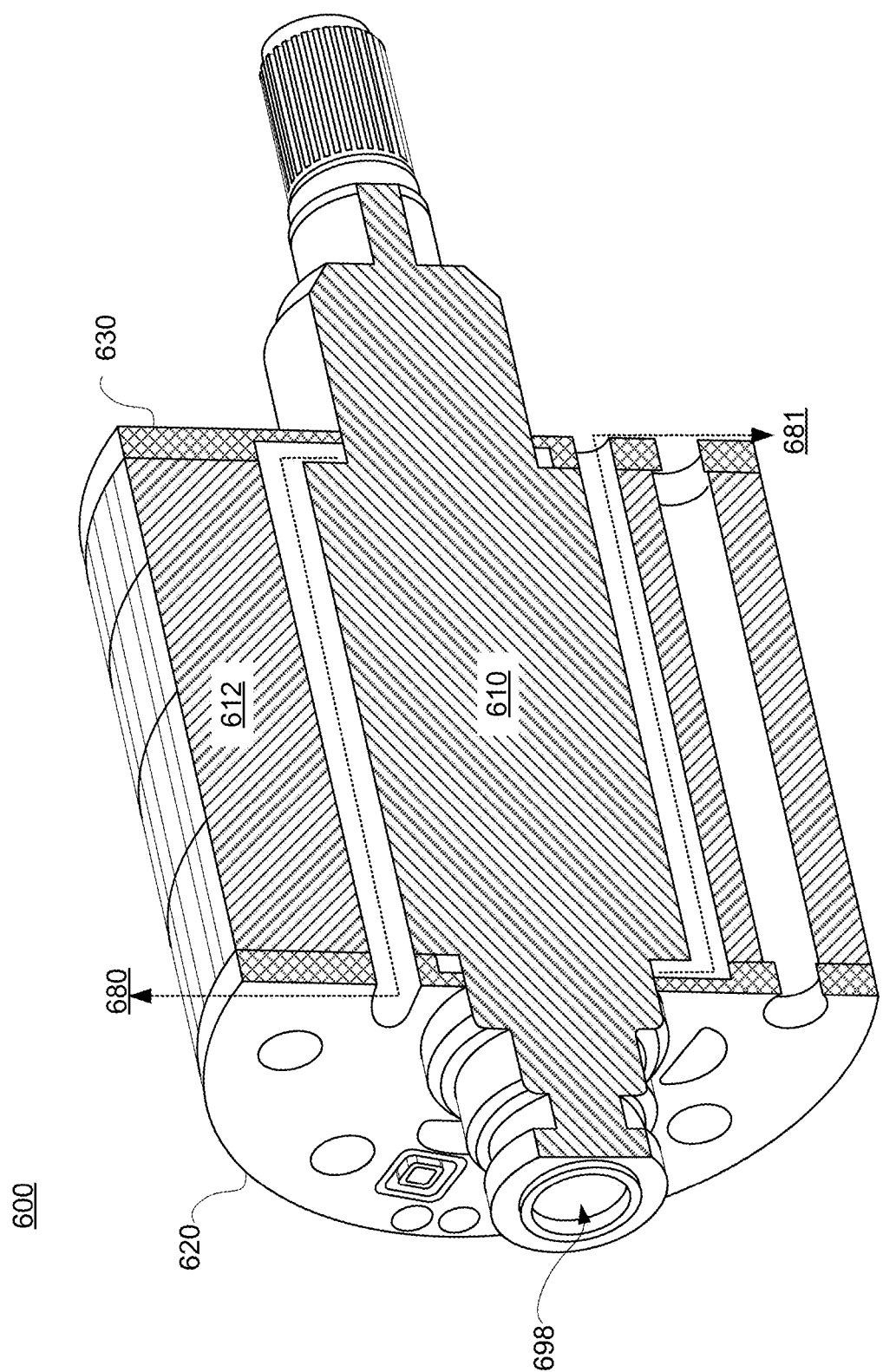
FIG. 6 shows a perspective off-axis cross-sectional view of an illustrative rotor configured for cross flow, in accordance with some embodiments of the present disclosure.

FIG. 5 shows a perspective view of illustrative end plate 500 having openings 510 and recess 520, in accordance with some embodiments of the present disclosure. To illustrate, end plate 500 may be, but need not be, the same as or similar to end plates 220 and 230 of FIG. 2, or end plates 320 and 330 of FIG. 3. As illustrated, end plate 500 includes four side holes indicated as openings 510, and an annular recess indicated as recess 520. For example, a fluid such as oil is directed into recess 520 from one or more feed holes, and then flows from recess 520 into axially directed rotor channels and out of side holes of another end plate (e.g., identical to end plate 500 but clocked 45 degrees azimuthally). End plate 500 includes side holes 510, though which the fluid exits after flowing from a recess of the other end plate through channels of the rotor (e.g., as illustrated in FIGS. 3 and 6). In an illustrative example, a rotor may include two end plates (e.g., a front plate and a rear plate), each identical to end plate 500, and clocked relative to each other, to form the cross flow pattern.

FIG. 6 shows a perspective off-axis cross-sectional view of illustrative rotor 600 configured for cross flow, in accordance with some embodiments of the present disclosure. Rotor 600 may be, but need not be, the same as rotor 300 of FIG. 3. Rotor 600 includes body 612, end plates 620 and 630, and shaft 610. Flow paths 680 and 681 are formed by body 612, end plates 620 and 630, and shaft 610. As illustrated in FIG. 6, the feed holes of rotor 600 are not visible, but connect flow paths 680 and 681 to hollow interior recess 698. In some embodiments, body 612 may include end plates 620 and 630 (e.g., any suitable grouping may be used to refer to parts of rotor 600). In some embodiments, body 612 includes permanent magnets, steel laminations, tie rods, any other suitable components, or any combination thereof. Flow paths 680 and 681 include axial sections wherein a fluid flows in axial cross flow, to improve uniformity in the spatial temperature field in rotor 600 (e.g., to cause axial temperature gradients to be more uniform). Fluid may flow along flow paths 680 and 681, and then may flow radially outward to stator end windings.

Figure 7:
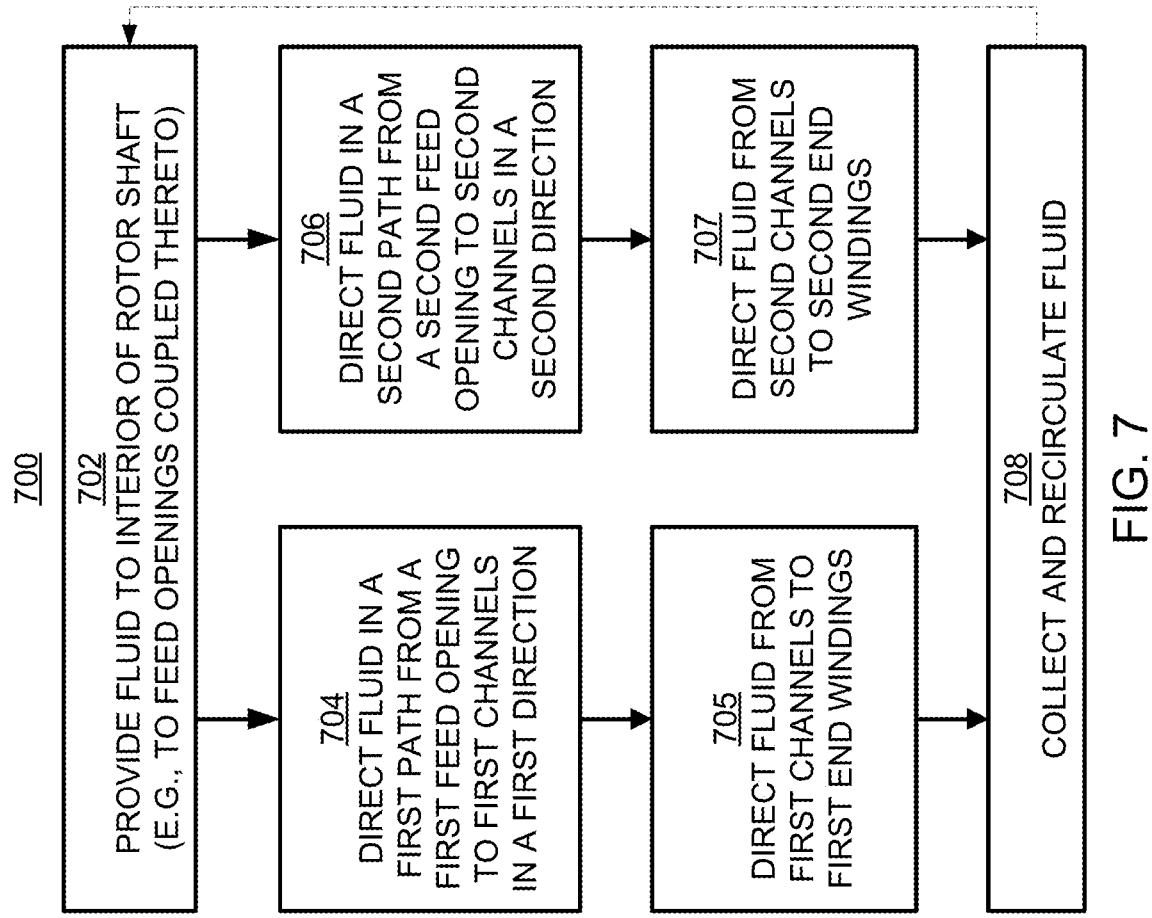
FIG. 7 is a block diagram of an illustrative process for directing fluid in cross flow in a motor, in accordance with some embodiments of the present disclosure.

FIG. 7 is a block diagram of illustrative process 700 for directing fluid in cross flow in a motor, in accordance with some embodiments of the present disclosure.

Step 702 includes providing fluid to an interior of a rotor shaft. Step 702 may include pumping the fluid to an increased pressure to cause the fluid to flow into the interior of the rotor shaft (e.g., a hollow interior region such as recess 398 of FIG. 3). In some embodiments, step 702 may include filtering the fluid, regulating a pressure of the fluid, controlling one or more flow paths of the fluid, controlling a flow rate of the fluid, controlling a temperature of the fluid (e.g., using a radiator or other heat exchanger), or a combination thereof. In an illustrative example, step 702 may include providing pressurized oil to the interior of the rotor shaft based on flow of the oil.

Step 704 includes directing fluid in a first path from a first feed opening to first channels in a first direction. In some embodiments, the fluid in the interior of the rotor shaft provided at step 702 is caused to flow in the first path based on a pressure field in the first path (e.g., the fluid flows in a path of decreasing pressure). For example, the first path may be open to the interior of the rotor shaft such that the fluid can flow from the interior of the rotor shaft through the first path. The first path may include, for example, a first feed opening interfaced to (e.g., in fluid communication with, or otherwise open to) the interior of the rotor shaft, one or more first channels, and a first opening through which the fluid exits.

Step 705 includes directing fluid from the first channels to first end windings. In some embodiments, after the fluid flows through the first channels, the fluid flows radially outward to spray or otherwise impinge on first end windings (e.g., of a stator corresponding to the rotor). The fluid may flow under the effects of centrifugal acceleration, pressure forces, gravity, or a combination thereof to the first end windings.

Step 706 includes directing fluid in a second path from a second feed opening to second channels in a second direction. In some embodiments, the fluid in the interior of the rotor shaft provided at step 702 is caused to flow in the second path based on a pressure field in the second path (e.g., the fluid flows in a path of decreasing pressure). For example, the second path may be open to the interior of the rotor shaft such that the fluid can flow from the interior of the rotor shaft through the second path. The second path may include, for example, a second feed opening interfaced to (e.g., in fluid communication with, or otherwise open to) the interior of the rotor shaft, one or more second channels, and a second opening through which the fluid exits.

Step 707 includes directing fluid from the second channels to second end windings. In some embodiments, after the fluid flows through the second channels, the fluid flows radially outward to spray or otherwise impinge on second end windings (e.g., of a stator corresponding to the rotor). The fluid may flow under the effects of centrifugal acceleration, pressure forces, gravity, or a combination thereof to the second end windings.

Step 708 includes collecting and recirculating the fluid. For example, after the fluid flows through or otherwise past the first and second end windings, the fluid is collected and recirculated. Step 708 may include collecting the fluid in a basin or a region of an oil-pan or sump, suctioning (e.g., via fluid pressure) or gravity draining the fluid to a filter, pump, radiator, plenum, any other suitable component, or any combination thereof. In some embodiments, for example, oil is directed past the first and second end windings and then is collected in a basin for recirculation to the interior of the rotor shaft (e.g., after removing heat via a radiator or heat exchanger).

Figure 8:
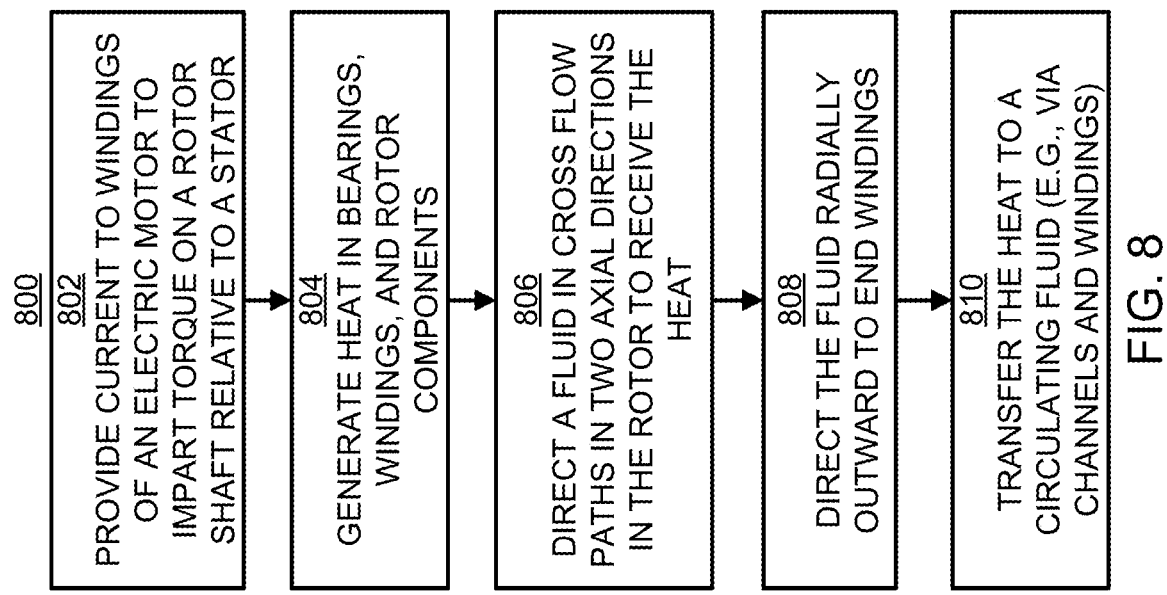
FIG. 8 is a block diagram of an illustrative process for removing heat from components of a motor using cross flow, in accordance with some embodiments of the present disclosure.

FIG. 8 is a block diagram of illustrative process 800 for removing heat from components of a motor using cross flow, in accordance with some embodiments of the present disclosure. To illustrate, process 800 may be applied to the motor, rotors, or assemblies of FIGS. 1-6, to use a fluid to remove heat from a motor or components thereof. In a further example, process 800, or any steps thereof, may be combined with any or all of the steps of process 700 of FIG. 7.

Step 802 includes providing current to windings of an electric motor to impart torque on a rotor shaft relative to a stator. In some embodiments, step 802 includes generating control signals for power electronics to apply current to phases of the electric motor, to generate torque on a rotor and cause rotational motion of the rotor relative to a stator. For example, in some embodiments, the rotor may include permanent magnets and the stator may include phase windings, including end windings, and stator teeth.

Step 804 includes generating heat in bearings, windings, and rotor components. For example, as the rotor rotates about an axis, heat may be generated in the rotor (e.g., due to losses), in bearings (e.g., due to friction), and in end windings (e.g., due to losses such as ohmic losses). In some embodiments, the amount of heat generated in the electric motor depends on the current profile applied at step 802. For example, as greater currents, greater duration of current, or both are applied, more heat may be generated in the electric motor and components thereof.

Step 806 includes directing a fluid in cross flow paths in two axial directions in the rotor to receive the heat. In some embodiments, step 806 includes directing the fluid in a first flow path and a second flow path, which direct flow axially in opposite directions in the rotor. In some embodiments, step 806 includes providing a pressurized fluid to feed holes of the rotor, thus causing the fluid to flow under pressure forces through the cross flow paths to respective sides holes.

Step 808 includes directing the fluid radially outward to end windings. In some embodiments, the fluid flows through the cross flow paths of step 806 and then flows out of respective side holes at each axial end of the rotor. The fluid then flows radially outward, at step 808, along end plates of the rotor to impinge on, or otherwise flow over, end windings arranged radially outward of the rotor. At step 808, the fluid may flow under centrifugal forces, gravity forces, pressure forces, or a combination thereof. For example, in some embodiments, the fluid flows radially outward as the rotor rotates and sprays onto the end windings, thus cooling the windings via convective heat transfer through a boundary layer.

Step 810 includes transferring the heat to the circulating fluid. The fluid receives heat via convection from the rotor and end windings, and transports the heat (e.g., thermal energy stored in the fluid) away from the rotor. For example, the fluid may be directed to a radiator or other heat exchanger to reject the heat transferred at step 810, and then be recirculated to the rotor for continued cooling.

In an illustrative example, an illustrative process (e.g., process 700, process 800, or a combination thereof) may include providing a coolant to a plurality of rotor channels extending axially through a rotor assembly and configured to provide cross flow of the coolant (e.g., at step 702 and/or step 806). The process may also include generating heat in the rotor assembly (e.g., at step 804), and transferring the heat from the plurality of rotor channels to the coolant (e.g., at steps 806 and 810, or during steps 704 and 706, or a combination thereof).

In a further illustrative example, a plurality of rotor channels may include a first rotor channel and a second rotor channel. The first rotor channel may extend axially in a first direction to a first side hole, and the second rotor channel may extend axially in a second direction, opposite the first direction, to a second side hole. Providing the coolant to the plurality of rotor channels may include, for example, providing the coolant to a first rotor channel coupled to a first feed hole, and providing the coolant to a second rotor channel coupled to a second feed hole (e.g., at steps 704 and 706, step 806, or a combination thereof).

In a further illustrative example, the rotor assembly may include a first end plate arranged at a first axial position that includes a first side hole, and a second end plate arranged at a second axial position that includes a second side hole. An illustrative process (e.g., process 700, process 800, or a combination thereof) may include causing coolant to flow radially outward along the first end plate to first end windings (e.g., at step 705 or step 808), causing the coolant to flow radially outward along the second end plate to second end windings (e.g., at step 707 or step 808), and transferring heat from the first end windings and from the second end windings to the coolant.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A cooling apparatus, comprising:
   two first rotor channels extending axially through a rotor assembly and configured to provide coolant flow in a first axial direction, wherein the two first rotor channels are coupled to a first feed hole that is arranged azimuthally between the two first rotor channels;
   two second rotor channels extending axially through the rotor assembly and configured to provide coolant flow in a second axial direction opposite the first axial direction, wherein the two second rotor channels are coupled to a second feed hole that is arranged azimuthally between the two second rotor channels;
   a first end plate comprising a first annular recess that couples the second feed hole to the two second rotor channels; and
   a second end plate comprising a second annular recess that couples the first feed hole to the two first rotor channels.

2. The cooling apparatus of claim 1, wherein:
   the first end plate is arranged at a first axial position and comprises two first side holes; and
   the second end plate is arranged at a second axial position and comprises two second side holes.

3. The cooling apparatus of claim 2, wherein:
   the first feed hole, the two first rotor channels, and the two first side holes form first flow paths for a coolant; and
   the second feed hole, the two second rotor channels, and the two second side holes form second flow paths for the coolant.

4. The cooling apparatus of claim 1, wherein:
   the first end plate and the second end plate are identical.

5. The cooling apparatus of claim 1, further comprising a rotor shaft comprising a hollow interior region, wherein:
   the first feed hole and the second feed hole are open to the hollow interior region; and
   the hollow interior region is configured to receive a coolant.

6. The cooling apparatus of claim 1, wherein the two first rotor channels and the two second rotor channels are formed in a body of the rotor assembly.

7. An apparatus comprising:
   a shaft comprising a first feed hole arranged at a first axial position and a second feed hole arranged at a second axial position spaced axially from the first axial position;
   a body comprising two first rotor channels and two second rotor channels, wherein:
      the two first rotor channels are coupled to the first feed hole that is arranged azimuthally between the two first rotor channels; and
      the two second rotor channels are coupled to the second feed hole that is arranged azimuthally between the two second rotor channels;
   a first end plate comprising a first annular recess and two first side holes, wherein the first annular recess couples the second feed hole to the two second rotor channels, and wherein the two first side holes open to the two first rotor channels; and
   a second end plate comprising a second annular recess and two second side holes, wherein the second annular recess couples the first feed hole to the two first rotor channels, and wherein the two second side holes open to the two second rotor channels.

8. The apparatus of claim 7, wherein the two first rotor channels and the two second rotor channels are formed in the body.

9. The apparatus of claim 7, wherein the first end plate and the second end plate are arranged at opposite axial ends of the body.

10. The apparatus of claim 7, wherein:
    the first end plate and the second end plate are identical.

11. The apparatus of claim 10, wherein the first end plate is arranged at about forty-five degrees relative to the second end plate.

12. The apparatus of claim 7, wherein:
    the shaft comprises a hollow interior region;
    the first feed hole and the second feed hole are open to the hollow interior region; and
    the hollow interior region is configured to receive a fluid.

13. The apparatus of claim 7, wherein:
    the first feed hole, the two first rotor channels, and the two first side holes form first flow paths for a fluid;
    the second feed hole, the two second rotor channels, and the two second side holes form second flow paths for the fluid; and
    the first flow paths and the second flow paths form a cross flow pattern.

14. The apparatus of claim 7, wherein:
    the body further comprises a plurality of laminations stacked axially;
    each respective lamination comprises a respective plurality of openings; and
    the respective plurality of openings collectively form the two first rotor channels and the two second rotor channels.

15. The apparatus of claim 7, wherein:
    the first end plate is configured to direct a fluid from the two first side holes radially outward to first end windings; and
    the second end plate is configured to direct the fluid from the two second side holes radially outward to second end windings.

16. A method comprising:
    providing a coolant to two first rotor channels coupled to a first feed hole that is arranged azimuthally between the two first rotor channels and two second rotor channels coupled to a second feed hole that is arranged azimuthally between the two second rotor channels, wherein:
       the two first rotor channels extend axially in a first direction through a rotor assembly to two first side holes,
       the two second rotor channels extend axially through the rotor assembly in a second direction, opposite the first direction, to two second side holes,
       the first feed hole is coupled to the two first rotor channels via a second annular recess of a second end plate, and
       the second feed hole is coupled to the two second rotor channels via a first annular recess of a first end plate;
    generating heat in the rotor assembly; and
    transferring the heat from the two first rotor channels and the two second rotor channels to the coolant.

17. The method of claim 16, wherein:
    the first end plate is arranged at a first axial position and comprises the two first side holes; and
    the second end plate is arranged at a second axial position and comprises the two second side holes, the method further comprising:

causing the coolant to flow radially outward along the first end plate to first end windings,
causing the coolant to flow radially outward along the second end plate to second end windings, and
transferring heat from the first end windings and from the second end windings to the coolant.

\* \* \* \* \*